Patented Dec. 25, 1934

1,985,692

UNITED STATES PATENT OFFICE 1,985,692

PROCESS FOR BREAKING PETROLEUM EMULSIONS

Claudius H. M. Roberts, Long Beach, Calif., assignor to Tretolite Company, Webster Groves, Mo., a corporation of Missouri No Drawing. Application April 13, 1933, Serial No. 665,961

13 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedure.

The treating agent used in my process consists of a modified heterocyclic compound derived by the addition to a heterocyclic compound or substitution in the ring of a heterocyclic compound, of a non-sulfo hydrocarbon radical, or hydrocarbon radical derivative.

Heterocyclic compounds are compounds in which the closed ring is formed partly of carbon atoms and partly of other elements. These heterocyclic compounds are generally referred to as non-aromatic, insofar that the aromatic compounds contemplate those in which the ring is composed entirely of carbon atoms. In heterocyclic compounds the atom other than the carbon atom, which is part of the ring, must be an element such as sulfur, oxygen, nitrogen, etc., which is polyvalent. Examples of heterocyclic compounds suitable for use in producing the treating agent contemplated by my process are furane, pyrrole, thiophene, pyridine, quinoline, pyrazole, triazole, tetrazole, etc. The homologues of these materials are as suitable as the materials themselves. Likewise, their derivatives, such as the chlor derivatives, halogen derivatives, sulfo derivatives, nitro derivatives, hydroxy derivatives, carboxy derivatives, etc., may be employed.

These products combine with hydrocarbons or hydrocarbon derivatives by means of reactions involving addition or substitution. For instance, pyridine is basic in character and may react with the carboxy or other acidic derivatives of hydrocarbons in the same manner that it reacts with hydrochloric acid. In other reactions a substitution may take place in the ring. For instance, if stearic acid, which I consider a carboxy hydrocarbon, is treated with phosphorous pentachloride, one introduces a labile chlorine atom and removes the hydroxyl of the carboxyl. If such material, stearochloride, is united with pyridine, there is an elimination of hydrochloric acid and a hydrocarbon group is introduced into the heterocyclic ring.

Another reaction which may be employed most advantageously in producing a demulsifying or treating agent suitable for use in my process, is illustrated by the reaction of sulfuric acid on an alkylene compound, or on an alcohol to form an aliphatic hydrogen sulfate. When said aliphatic hydrogen sulfate is reacted with a heterocyclic compound, such as pyridine, one may eliminate sulfuric acid, and thus introduce an alkyl radical into the heterocyclic nucleus. If, instead of employing a material such as ethylene, or an alcohol such as propyl alcohol, one employs an unsaturated fatty acid, such as oleic acid, then one introduces a fatty acid residue into the heterocyclic nucleus. It is obvious that such a reaction between oleic acid hydrogen hydrogen sulfate and pyridine, results in the formation of a material similar to a Twitchell reagent, provided that a sulfonic acid group is also introduced into the heterocyclic nucleus. When the hydrocarbon derivative residue introduced into the heterocyclic nucleus contains an acidic hydrogen, said acidic hydrogen may be permitted to remain as such, or it may be replaced by an equivalent, such as a metal, in the case of a salt, or by an organic group in the case of an ester, or by combination with a basic aromatic or basic aliphatic amine, or by reaction with an amine of the type wherein the hydroxyl of the carboxyl unites with the hydrogen of the amine, with the elimination of a molecule of water. Suitable salts may be produced by reaction with caustic soda, caustic potash, ammonium hydroxide, calcium hydroxide, magnesium hydroxide, etc. Esters may be produced by reaction with suitable aliphatic or aromatic alcohols, including ethyl alcohol, propyl alcohol, butyl alcohol, benzyl alcohol, etc. One may neutralize the acidic material with basic amines, such as triethanolamine, and the like. The water-soluble salts of these materials may be reacted with water-soluble metallic salts, such as aluminum salts, copper salts, iron salts, zinc salts and the like to produce metallic salts by metathesis. One may use the material in the form which exhibits oil-solubility, or water-solubility, or both.

Although any suitable hydrocarbon may be employed or any suitable hydrocarbon derivative which is susceptible to addition reactions or substitution reactions with the heterocyclic compounds, yet I prefer to use the detergent-forming acids or their non-sulfo modifications. One suitable class of materials include fatty acids, such as oleic acid, stearic acid, linolenic acid, ricinoleic acid, etc. Likewise, one may use the non-sulfo derivatives of these acids, such as the halogenated fatty acids, dihydroxystearic acid, chlorinated oleic acid, etc., provided that such modifications have not affected the carboxylic hydrogen or its equivalent. Likewise, one may use rosin, abietic acid, etc. Such material may be chlorinated before use, if desired. One may also use naphthenic acids, or suitable derivatives thereof.

For the sake of simplicity, I shall refer to these non-sulfo, organic, detergent-forming acids, and their modifications, as detergent-forming acids. It is understood that this expression is employed in the sense that it includes the various modifications previously referred to, and it is also intended to include the acids, as such, or their salts or esters or amine derivatives. It is understood, of course, that a sulfo group, either a sulfonic acid group, or an acid sulfate group, may be attached to or substituted in the heterocyclic nucleus, but that the organic detergent-forming acids shall be free from any such sulfo radical.

The reagents employed in my process are essentially of two types. The heterocyclic compound may be indicated by X, and the hydrocarbon may be indicated by R. In the event that the compound formed by chemical reaction is a substitution product, then the heterocyclic compound residue may be indicated by X', and the hydrocarbon residue by R', and the compound obtained by the formula X'R'. If such substituted hydrocarbon is carboxylic in nature, the substitution compound may be indicated by X'R''COOH, in which COOH is the conventional carboxylic radical. The acidic hydrogen of the carboxyl COOH may be replaced by any acidic hydrogen equivalent, such as a metal, or an organic radical, or a basic amine residue. Furthermore, the hydroxyl of the carboxyl may be replaced by an amine residue. In the event that a chlor-derivative of the heterocyclic compound is used, one may indicate a similar product by the formula ClX''R''COOH. In the event that a reagent of the type X'R''COOH is subjected to sulfonation, with the production of a sulfonic derivative similar to a Twitchell reagent, one may indicate the substance by the formula $HSO_3X''R''COOH$. In this last instance the acidic hydrogen of the sulfonic group may be neutralized or replaced by the same equivalents which have been previously mentioned in the case of the carboxyl hydrogen.

In addition to substitution products of the kind disclosed, one may also form addition products by reacting a basic heterocyclic compound, such as X, with an acid hydrocarbon or acid hydrocarbon derivative, free from sulfo groups, so as to form a compound of the type XRH, in which X is the heterocyclic compound, RH is the acidic hydrocarbon or acidic hydrocarbon derivative, and H represents an acidic hydrogen atom thereof. Such basic heterocyclic compounds are substantially neutralized by reaction with a monobasic, acidic hydrocarbon or hydrocarbon derivative. However, if the heterocyclic compound X is reacted with a dibasic, acidic hydrocarbon or hydrocarbon derivative, such as the dibasic acid derivative obtained by the action of phosphoric acid or anhydride on oleic acid, one may obtain an addition product in which there remains an unneutralized hydrogen ion, which may be indicated by the formula XR'HH, in which one of the two hydrogen ions thus indicated, is susceptible to neutralization in the same manner as the hydrogen in the carboxylic radical referred to.

I shall refer to either the addition type reaction product, or the substitution type reaction product as a condensation product. Indeed, one might add two hydrocarbon or hydrocarbon derivative residues, one by addition and the other by substitution—or two might be added by substitution alone.

I shall use the expression "reactive hydrocarbon body" to mean a suitable reactive hydrocarbon or hydrocarbon derivative, which will unite by addition or substitution in the presence or absence of a suitable reagent, such as phosphoric pentachloride, if required, to produce a condensation product.

My preferred reagent is obtained in the following manner: Oleic acid is converted into oleic acid hydrogen hydrogen sulfate in the manner disclosed in U. S. Patent No. 1,894,759, to De Groote and Wirtel, dated January 17, 1933. Such oleic acid hydrogen sulfate is reacted with a molecular amount of pyridine, so as to form a substitution product in which an oleic acid, or more properly, stearic acid, is introduced into a heterocyclic ring. Since pyridine is basic in character, and since oleic acid hydrogen hydrogen sulfate is acidic in character, there is also formed an addition compound containing a sulfo group. If the reaction product is subjected to hydrolysis with water at or near 100° C., the addition product is decomposed and the substitution product is unaffected. If the mixture is then heated and distilled to approximately 120° C., the uncombined pyridine or pyridine resulting from the decomposition of the pyridine addition product, is eliminated, and the substituted pyridine remaining behind contains uncombined hydroxystearic acid resulting from the decomposition of the pyridine addition product or from the decomposition of uncombined oleic acid hydrogen hydrogen sulfate. However, the pyridine substitution product may be employed, even though there is some hydroxystearic acid present. The material may be used in the acidic state, or after neutralization with a suitable alkaline material, or after esterification, or after reaction with an amine, etc.

The materials previously described need not be employed alone, as a demulsifying agent, but may be employed in conjunction with other suitable demulsifiers, such as water softeners, modified fatty acids, oil soluble or water-soluble petroleum sulfonic acids, substituted aromatic sulfonic acids, dialkyl sulfo acids, substituted amine acidic bodies, etc., or the salts and esters of the same or the like. One may add any suitable inert solvent or solvents to the reagent contemplated, particularly solvents which would lower the viscosity of the product and make it more adaptable for use, such as kerosene, solvent naphtha, cresol, pine oil, ethyl alcohol, butyl alcohol, propyl alcohol, etc.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described my invention, what I claim as new and desire to secure by Letters Patent is:

1. A process for breaking a petroleum emulsion of the water-in-oil type, which consists in subjecting the emulsion to the action of a demulsifying agent comprising a condensation product of a heterocyclic compound and a non-sulfo reactive hydrocarbon body.

2. A process for breaking a petroleum emulsion of the water-in-oil type, which consists in subjecting the emulsion to the action of a demulsifying agent comprising a condensation product of a heterocyclic compound and a non-sulfo detergent-forming hydrocarbon body.

3. A process for breaking a petroleum emulsion of the water-in-oil type, which consists in subjecting the emulsion to the action of a demulsifying agent comprising a condensation product of a heterocyclic compound and a non-sulfo fatty body.

4. A process for breaking a petroleum emulsion of the water-in-oil type, which consists in subjecting the emulsion to the action of a demulsifying agent comprising a condensation product of a heterocyclic compound and a non-sulfo resin body.

5. A process for breaking a petroleum emulsion of the water-in-oil type, which consists in subjecting the emulsion to the action of a demulsifying agent comprising a condensation product of a heterocyclic compound and a non-sulfo carboxy-petroleum body.

6. A process for breaking a petroleum emulsion of the water-in-oil type, which consists in subjecting the emulsion to the action of a demulsifying agent comprising a condensation product of a heterocyclic compound and a non-sulfo fatty body containing a hydrogen ion equivalent.

7. A process for breaking a petroleum emulsion of the water-in-oil type, which consists in subjecting the emulsion to the action of a demulsifying agent comprising a condensation product of a heterocyclic compound and a non-sulfo fatty body containing a hydrogen ion equivalent and in the form of a salt.

8. A process for breaking a petroleum emulsion of the water-in-oil type, which consists in subjecting the emulsion to the action of a demulsifying agent comprising a condensation product of a heterocyclic compound and a non-sulfo fatty body containing a hydrogen ion equivalent and in the form of a water-soluble salt.

9. A process for breaking a petroleum emulsion of the water-in-oil type, which consists in subjecting the emulsion to the action of a demulsifying agent comprising a condensation product of a heterocyclic compound and a non-sulfo fatty body containing a hydrogen ion equivalent and in the form of a water-soluble ammonium salt.

10. A process for breaking a petroleum emulsion of the water-in-oil type, which consists in subjecting the emulsion to the action of a demulsifying agent comprising a condensation product of a mono-cyclic heterocyclic compound and a non-sulfo fatty body containing a hydrogen ion equivalent and in the form of a water-soluble ammonium salt.

11. A process for breaking a petroleum emulsion of the water-in-oil type, which consists in subjecting the emulsion to the action of a demulsifying agent comprising a condensation product of a pyridine compound and a non-sulfo fatty body containing a hydrogen ion equivalent and in the form of a water-soluble ammonium salt.

12. A process for breaking a petroleum emulsion of the water-in-oil type, which consists in subjecting the emulsion to the action of a demulsifying agent comprising a condensation product of a pyridine compound and an oleic acid body containing a hydrogen ion equivalent and in the form of a water-soluble ammonium salt.

13. A process for breaking a petroleum emulsion of the water-in-oil type, which consists in subjecting the emulsion to the action of a demulsifying agent comprising a condensation product of a pyridine compound and an oleic acid body containing a hydrogen ion equivalent and in the form of a water-soluble ammonium salt, and derived by a substitution reaction involving pyridine and oleic acid hydrogen hydrogen sulfate with the elimination of sulfuric acid.

CLAUDIUS H. M. ROBERTS.